(12) United States Patent
Baumgartner et al.

(10) Patent No.: US 7,958,974 B2
(45) Date of Patent: Jun. 14, 2011

(54) ELECTROMECHANICALLY ACTUABLE DISC BRAKE WITH ACTUATING PLUNGER

(75) Inventors: Johann Baumgartner, Moosburg (DE); Robert Gruber, Olching (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/364,956

(22) Filed: Feb. 3, 2009

(65) Prior Publication Data

US 2009/0188761 A1 Jul. 30, 2009

Related U.S. Application Data

(63) Continuation of application No. PCT/EP2007/006647, filed on Jul. 26, 2007.

(30) Foreign Application Priority Data

Aug. 3, 2006 (DE) .......................... 10 2006 036 279

(51) Int. Cl.
*F16D 55/14* (2006.01)
(52) U.S. Cl. ..................... 188/72.2; 188/71.7; 188/72.5; 188/72.9; 188/73.1; 188/73.34; 188/70 B
(58) Field of Classification Search .................. 188/71.7, 188/72.2, 72.5, 72.9, 73.1, 73.34
See application file for complete search history.

(56) References Cited

U.S. PATENT DOCUMENTS

| | | | | |
|---|---|---|---|---|
| 3,207,267 A | * | 9/1965 | Beuchle et al. | 188/72.2 |
| 3,690,417 A | * | 9/1972 | Airheart | 188/71.8 |
| 3,809,190 A | | 5/1974 | Evans | |
| 4,089,392 A | * | 5/1978 | Ostrowski | 188/71.4 |
| 4,852,699 A | * | 8/1989 | Karnopp et al. | 188/72.2 |
| 5,219,048 A | * | 6/1993 | Shaw et al. | 188/72.1 |
| 6,311,809 B1 | | 11/2001 | Thomas et al. | |
| 6,799,662 B1 | * | 10/2004 | Murdoch | 188/72.9 |
| 6,899,204 B2 | * | 5/2005 | Baumgartner et al. | 188/72.9 |
| 2004/0026181 A1 | | 2/2004 | Baumgartner et al. | |
| 2004/0108175 A1 | | 6/2004 | Schautt | |
| 2004/0238294 A1 | | 12/2004 | Baumann et al. | |

FOREIGN PATENT DOCUMENTS

| | | |
|---|---|---|
| DE | 40 32 885 A1 | 4/1992 |
| DE | 101 39 913 A1 | 9/2002 |
| DE | 101 56 348 C1 | 4/2003 |
| DE | 10 2005 030 618 A1 | 4/2006 |
| EP | 224341 A1 * | 6/1987 |
| FR | 2 855 574 A1 | 12/2004 |
| WO | WO 97/22814 A1 | 6/1997 |
| WO | WO 03/071150 A1 | 8/2003 |
| WO | WO 2007/082658 A1 | 7/2007 |

OTHER PUBLICATIONS

International Search Report dated Nov. 15, 2007 w/English translation (six (6) pages).

\* cited by examiner

*Primary Examiner* — Bradley T King
*Assistant Examiner* — Mahbubur Rashid
(74) *Attorney, Agent, or Firm* — Crowell & Moring LLP

(57) ABSTRACT

A self-boosting electromechanically actuable disc brake, having an application device for applying the brake pad, which application device has a rotary brake lever and a self-boosting device, wherein the rotary brake lever acts on an actuating plunger which acts on the application-side brake lining directly or via a pressure plate, is characterized in that the actuating plunger is pivotably mounted on the rotary brake lever and on the pressure plate or the application-side brake lining with an intersecting rotational axis.

19 Claims, 2 Drawing Sheets

ELECTROMECHANICALLY ACTUABLE DISC BRAKE WITH ACTUATING PLUNGER

CROSS-REFERENCE TO RELATED APPLICATIONS

This application is a continuation of PCT International Application No. PCT/EP2007/006647, filed Jul. 26, 2007, which claims priority under 35 U.S.C. §119 to German Patent Application No. DE 10 2006 036 279.9, filed Aug. 3, 2006, the entire disclosures of which are herein expressly incorporated by reference.

This application contains subject matter related to U.S. application Ser. No. 12/364,939, entitled "Electromechanically Actuated Disc Brake With Guide Plate," filed on even date herewith.

BACKGROUND AND SUMMARY OF THE INVENTION

The invention relates to an electromechanically actuated disc brake having a self-boosting design.

Disc brakes, which reduce the power demand of the drive, by utilizing self-boosting effects have been known for a long time.

Typical examples of brakes of this type are described for example in DE 101 56 348 C1, in the slightly older, generic patent application DE 101 39 913.8, and in DE 10 2005 030 618.7.

Brakes of such design have in common the fact that the support of the tangential forces which act on the brake pad, takes place by way of a wedge or ramp system, which provides the self-boosting action.

Here, the friction force which acts on the brake pad is transmitted by a part, which is connected to the brake pad and which is movable with the latter in the tangential direction, of the self-boosting device via rolling bodies or by way of sliding contact against a part, which is stationary in the tangential direction, of the self-boosting device.

In disc brakes which do not have a self-boosting design and which have direct lever actuation, as described for example in DE 40 32 885 or WO 97/22 814, the actuating rams or plungers (or the bridge with plungers screwed therein) are guided with a narrow degree of play at least in the tangential direction. In DE 40 32 885, pivotably movable guidance of the bridge on the brake rotary lever is also provided.

The invention is initially based on the concept of utilizing a lever actuation, by way of a rotary lever, with a rotational axis which is orthogonal with respect to the brake disc rotational axis, for also applying a self-boosting disc brake.

In self-boosting disc brakes, however, a movement of the brake pad in the rotational direction of the brake disc is necessary to realize the self-boosting action.

In the case of actuating plungers which are guided in a movable or pivotable manner, this results in a relative movement between the brake pad or lining pressure plate and the actuating plunger(s).

Since high forces are transmitted via the contact point between the actuating plunger and the pressure plate both in the application and also in the retraction direction, the compensation of the relative movement requires suitable design measures.

In WO 03/07 1150 (Haldex), therefore, a self-boosting disc brake with a spindle drive, or with a direct rotationally actuated eccentric drive, has been described in which, to actuate the brake, the spacing between the bridge and the pressure plate is adjusted by a connecting rod which is driven by a crank. The connection of the connecting rod to the pressure plate permits a tangential movement of the brake pad and pressure plate by way of a pivoting movement of the connecting rod, with the other point of articulation of the connecting rod on the bridge remaining axially fixed. In this embodiment, the wear adjustment of the self-boosting disc brake takes place between the brake housing and the bridge.

In the lever-actuated brake, however, there is additionally a pivoting movement about the pivot axis, which is arranged in a crossing fashion, of the lever eccentric. Further difficulties arise from the necessity for the adjusting rotational movement to be introduced into the actuating plunger, which is pivotable about two mutually perpendicular axes.

Against this background, it is the object of the invention to make it possible, in a simple manner, for lever actuation to also be used for self-boosting disc brakes.

The invention achieves this, and other, objects by a self-boosting electromechanically actuable disc brake having a brake caliper, at least one application-side and one reaction-side brake pad, and a brake disc. An electromechanical drive and a brake application device for applying the brake pad are provided, which brake application device has a rotary lever and a self-boosting device. The rotary lever acts on a single-part or multi-part actuating plunger, which acts directly or via a pressure plate on the application-side brake pad. Preferably, at least one wear adjusting device for adjusting brake pad and/or disc wear is provided. The actuating plunger is pivotably mounted on the rotary lever and on the pressure plate or on the application-side brake pad.

According thereto, the actuating plunger is pivotably mounted on the rotary lever and on the pressure plate or on the application-side brake pad with a preferably intersecting rotational axis, which makes it possible, in a simple manner, for the concept of the rotary lever actuation to also be used for self-boosting disc brakes.

The actuating plunger is preferably pivotably fastened to the brake rotary lever and to the pressure plate or to the application-side brake pad in such a way that the actuating plunger can transmit tensile and compressive forces between the brake pad and its drive (for example an electric motor with a threaded drive).

The expression "actuating plunger" or "actuating ram" should not be interpreted in a narrow sense. The expression, in particular, also encompasses modules which are variable in length and which are composed of a plurality of elements.

For a directly lever-actuated self-boosting disc brake, therefore, a coupling of the actuating plunger to the pressure plate of the brake pad has been discovered, by which both application and retraction actuating forces and movements can be transmitted safely and reliably. The actuating plunger is particularly preferably mounted on and fastened to the eccentric rotational shaft of the rotary lever and to the pressure plate or to the application-side brake pad in such a way that the actuating plunger can compensate pivoting movements of the rotary lever and tangential sliding movements of the brake pad and, if appropriate, of the pressure plate by pivoting in the mutually perpendicular pivoting directions.

Therefore, with a small amount of required installation space, it is both the case that the tangential movement of the pressure plate, which is required to obtain the self-boosting action is enabled, and also that a compensation of the tilting movement of the actuating plunger is enabled on account of the purely rotationally movable guidance in the eccentric of the brake rotary lever.

The transmission of force takes place, here, both on the brake rotary lever side and also on the lining pressure plate side via joint journals, with the journal of the brake rotary lever being arranged such that its rotational axis intersects that of the lining pressure plate.

The actuating plunger unit is preferably fitted, at both mounting ends, with pivot bearings, for example plain spherical bearings.

Furthermore, according to one particularly advantageous refinement, the introduction of the adjusting rotational movement into the actuating plunger, which is pivotable in two directions, is enabled.

For this purpose, the actuating plunger is firstly designed as a module, which is axially variable in length, in particular telescopic, and which permits a change in length of the brake ram for compensating brake pad and/or disc wear.

The actuating plunger module is preferably composed of an actuating plunger, threaded spindle and joint bearing housing, and is coupled by way of a synchronization gearing to a wear adjusting device.

The actuating plunger unit composed of the actuating plunger, the threaded spindle and the joint bearing housing is particularly preferably connected in a structurally simple manner to a gearwheel in order to transmit the adjusting rotational movement.

Here, the gearwheel is preferably designed such that, when the brake is not actuated, that is to say in the rest position of the actuating plunger, there is a narrow degree of tooth play with respect to the further coupled gearwheels.

When the brake is actuated, however, the gearwheels are placed so far out of engagement by the application movement of the actuating plunger that the pivoting movement of the actuating plunger, which then takes place, is enabled.

Alternative embodiments are also possible for the joint bearings on the brake rotary lever eccentric rotational axle shaft and at the pressure plate connection of the actuating plunger.

It is, for example, also possible to use a pivotable spherical roller bearing on the brake rotary lever eccentric axle shaft. At the connecting point to the pressure plate, simpler solutions are also contemplated for compensating the pivoting movement, which results from the pivotably movable guidance on the brake rotary lever. Even a slightly spherical rotary axle may be sufficient, and/or a bearing bush which is flared slightly in terms of diameter toward the two end regions.

According to a further invention, which is also to be considered as independent, the stationary component of the self-boosting device, which stationary component is connected to the wear adjusting device, is preferably held, with a small degree of play, parallel to the brake disc rotational axis between guide surfaces of the axially fixed component of the brake. This is done in such a way that, during braking processes, the tangential forces which occur are transmitted, so as to be supported, directly from the stationary component of the self-boosting device to the axially fixed component of the brake.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
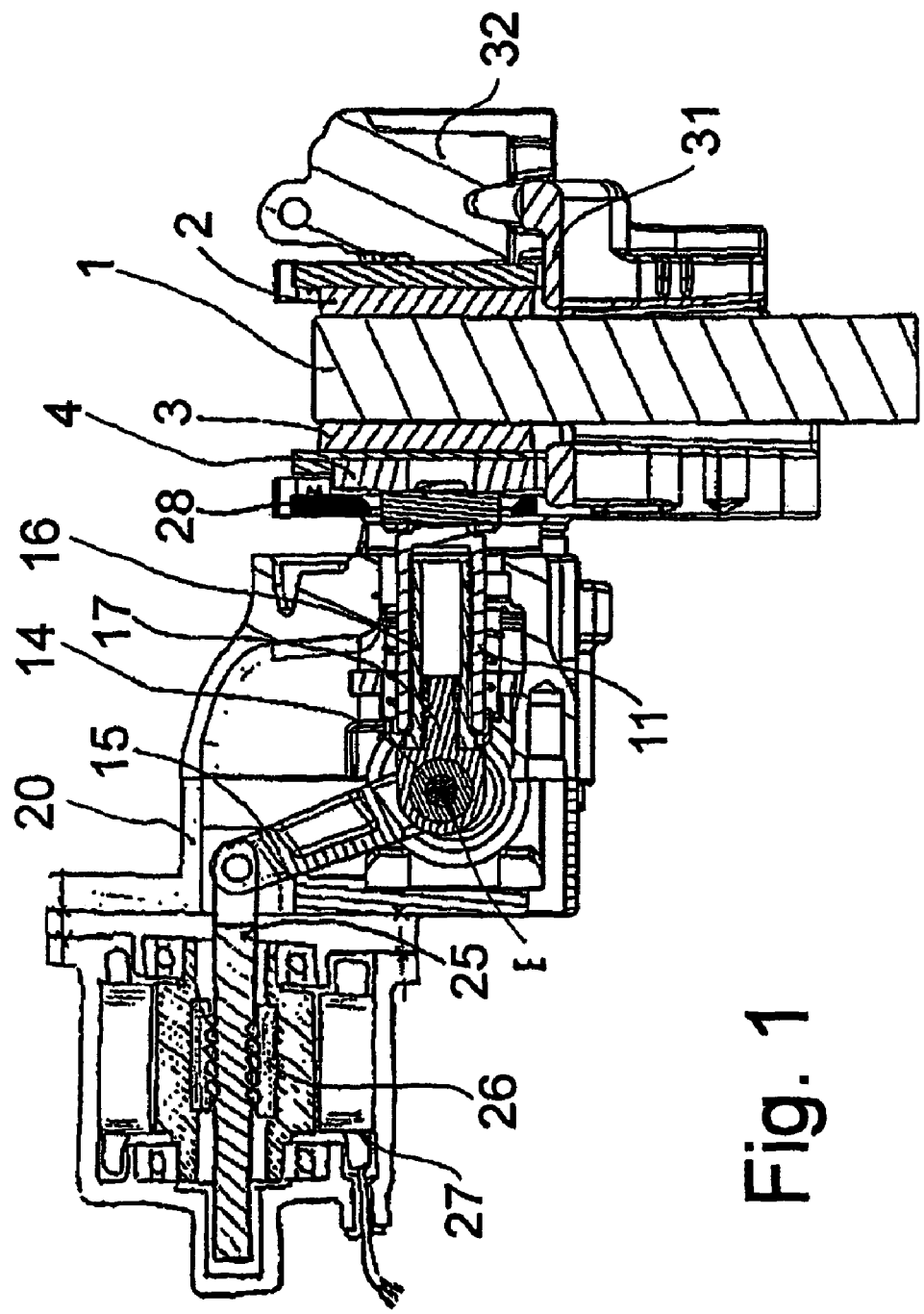
FIG. 1 is a first sectioned view through a sliding-caliper disc brake.

FIG. 1 shows electromechanically actuable sliding-caliper disc brake having brake pads 2 and 3 arranged at both sides of a brake disc 1.

The embodiment as a sliding-caliper disc brake is one possible design. Embodiments as a pivoting-caliper disc brake or as a fixed-caliper disc brake or as mixtures of those designs are also contemplated but not illustrated here. Similarly, pneumatically actuable disc brakes are also contemplated.

The sliding-caliper disc brake has a caliper 32 (with a brake caliper cover 20), which straddles over the brake disc 1 in a peripheral edge region. The caliper 32/20 is of a one-piece or, in this case, multi-part design, and contains a brake application device. The brake caliper 32/20 is movably guided by a caliper sliding guide on an axially fixed brake carrier 31.

An electric motor 27 on the brake housing 20 acts via a threaded drive, in this case a ball screw drive 26, on a brake rotary lever 15, which is preferably mounted eccentrically in the brake caliper 32 and which, as a result of an actuation by the ball screw drive, can be pivoted about a rotational axis which is aligned perpendicular to the brake disc rotational axis D.

The brake rotary lever 15 acts, in turn, via at least one brake plunger or ram 11 directly or via a pressure plate 4 on an application-side brake pad 3.

Here, the brake ram 11 and the brake rotary lever 15 (and also the brake ram 11 and the pressure plate 4), are articulatedly connected to one another such that the brake ram 11 can, during the application of the disc brake, completely or at least substantially follow a movement of the application-side brake pad 3 in the tangential direction of the brake disc 1.

Here, the brake application device is designed such that tensile and compressive forces can act on the brake pad 3, that is to say the electric motor can be utilized for applying and releasing the brake.

The actuation-side brake pad 3 is held in the pressure plate 4. The pressure plate 4 is movable parallel to the brake disc friction surface and is operatively connected, by means of rolling bodies, in this case balls 5 and 6, which are mounted therein, to ramps 7 and 8 of pressure rams or adjusting pistons 9 and 10 which are axially adjustable in length and which are aligned at an acute angle of greater than 0 and less than 90° with respect to the brake disc friction surface. The ramps 7, 8 could also or additionally be formed in the pressure plate 4. The balls (or other rolling bodies) would in this case be guided in spherical recesses of the pressure rams 9, 10, which would nevertheless be part of the self-boosting device within the context of the invention.

Figure 2:
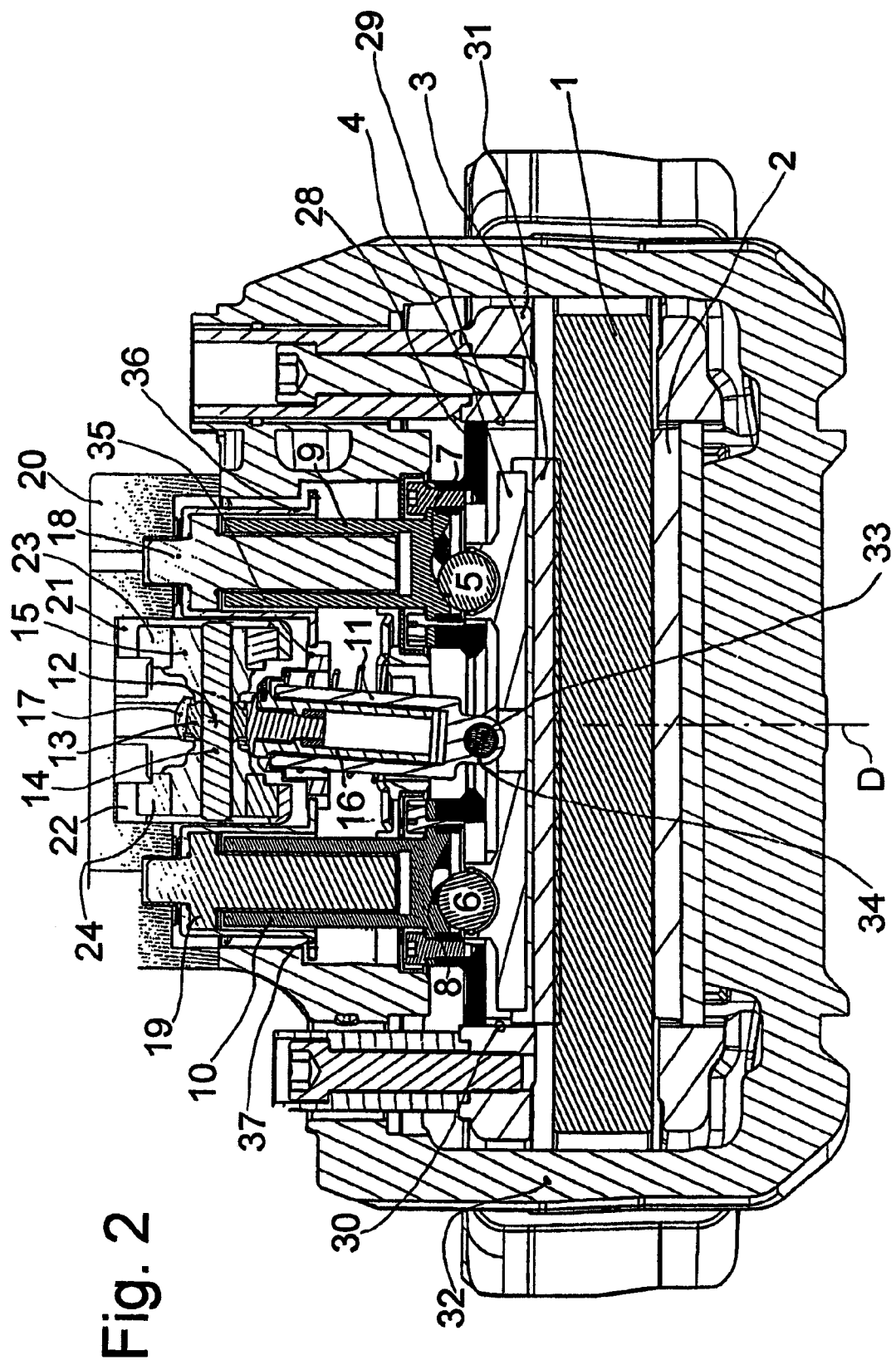
FIG. 2 is a further sectioned view through the disc brake from FIG. 1.

As already mentioned, the actuating plunger 11 is articulatedly connected to the pressure plate 4 to transmit the compressive and tensile forces, which act in the direction of the brake disc. The articulated connection is provided here by way of a journal 33 and a fork head 34. The articulated connection permits, in the event of a tangential movement of the pressure plate 4, a pivoting movement of the actuating plunger 11 about the ball central point 12 (which lies on the eccentric rotational axle E—FIG. 2) of a spherical bearing 13.

The spherical bearing 13 is held on the eccentric axle shaft 14 of the brake rotary lever 15 to transmit the actuating forces to the actuating plunger 11.

The actuating plunger 11 is screwed to a threaded piston 16, with the threaded piston 16 in turn being fixedly connected to a joint bearing housing 17.

The actuating plunger 11 forms, with the threaded piston 16, a plunger or adjusting piston, which is variable in length for the purpose of wear adjustment.

In the same way, the two pressure rams 9 and 10 are screwed to threaded spindles 18 and 19, which transmit the supporting force of the pressure rams 9/10 to the brake caliper/cover 32/20.

The threaded spindles 18/19 are connected to the threaded piston 16 by a synchronization gearing. In this way, it is obtained that the drive rotational movement of the adjusting drive acts only synchronously on the two pressure rams 9/10 and the actuating plunger 11.

The brake rotary lever 15 is mounted in a low-friction manner in the two bearing blocks 21/22 by way of two rolling bearings 23/24. The bearing blocks 21/22 are fixedly connected to the brake caliper/cover 32/20.

A spindle 25 of a ball screw drive 26 is fastened to the lever arm of the brake rotary lever 15 to transmit tensile and compressive actuating forces.

To actuate the brake, the ball screw drive 26 is driven by the electric motor 27.

The pressure rams 9/10, at their end facing the brake disc 1, are held in a guide plate 28, or are designed, in such a way that, on the ramps 7/8, support forces which act parallel to the brake disc friction surface are introduced into the guide plate 28 and are dissipated from the latter, depending on the rotational direction of the brake disc, to the guide surfaces 29 or 30 on the brake carrier 31.

The guidance of the pressure rams 9/10 and of the actuating plunger 11 takes place, at that end thereof which faces toward the brake disc 1, exclusively by the guide plate 28 and the brake carrier 31.

The brake caliper 32, adjusting device 35/36/37, and the caliper sliding guide 38/39 are relieved of the load of the tangential forces.

Here, the brake rams 9, 10 are preferably simply screwed directly to the guide plate 28.

A braking process using the disc brake will be described by way of example.

In the event of a braking demand by the actuation of the brake pedal and therefore of the brake setpoint value transducer which is connected to the brake pedal being detected, the electric motor 27 is activated by an electronic brake control unit in order to generate an application movement of the ball screw drive 26.

The spindle 25 of the ball screw drive 26 moves the lever arm of the brake rotary lever 15 in the direction of the brake disc.

Here, the brake rotary lever 15 is pivoted in its bearings 23/24 and therefore also moves its eccentric shaft 14, and therefore the spherical bearing 13, in the direction of the brake disc corresponding to the lever ratio. The movement of the spherical bearing 13 is transmitted to the pressure plate 4 via the actuating plunger, or via the component chain 12→13→17→16→11→33→34.

Here, the pressure plate 4 with the brake pad 3 is moved, initially so as to overcome the air play (gap) and at right angles to the friction surface of the brake pad 3, in the direction of the brake disc 1. When the brake pad 3 comes into contact with the friction surface of the brake disc 1, the brake pad 3 and the pressure plate 4 which is connected thereto are also moved, by the friction force of the brake disc 1 which is generated, in the rotational direction of the brake disc 1.

The balls 5/6 are guided along on the ramps 7/8 and, here, bring about an intensified movement of the pressure plate 4 in the direction of the brake disc in addition to the tangential movement of the pressure plate 4. The contact force which is introduced by the actuating plunger 11 is boosted here correspondingly to the increased spread of the brake caliper 32. As a result of the tangential movement of the pressure plate 4, the actuating plunger 11 performs a pivoting movement about the spherical bearing 13 and the journal 33. The reaction-side brake pad 2 is, as is conventional in sliding-caliper brakes, moved into contact with the brake disc 3 as a result of a movement of the brake caliper. It is not necessary to provide a self-boosting device here.

| Table of Reference Symbols | |
|---|---|
| Brake disc | 1 |
| Brake pads | 2, 3 |
| Pressure plate | 4 |
| Balls | 5 and 6 |
| Ramps | 7 and 8 |
| Pressure ram | 9 and 10 |
| Actuating plunger | 11 |
| Ball central point | 12 |
| Spherical bearing | 13 |
| Eccentric axle shaft | 14 |
| Brake rotary lever | 15 |
| Threaded piston | 16 |
| Joint bearing housing | 17 |
| Threaded spindles | 18 and 19 |
| Brake caliper cover | 20 |
| Bearing blocks | 21/22 |
| Rolling bearings | 23/24 |
| Spindle | 25 |
| Ball screw drive | 26 |
| Electric motor | 27 |
| Guide plate | 28 |
| Guide surfaces | 29 or 30 |
| Brake carrier | 31 |
| Brake caliper | 32 |
| Journal | 33 |
| Fork head | 34 |
| Wear adjusting device | 35/36/37 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self-boosting electromechanically or pneumatically actuable disc brake having a brake disc, the disc brake comprising:
   a caliper;
   an application-side and a reaction-side brake pad;
   a brake application device for applying the brake pads against the brake disc, the brake application device comprising a rotary lever, a self-boosting device, and an actuating plunger, the rotary lever being located within the caliper and acting on the actuating plunger which acts directly, or via a pressure plate, on the application-side brake pad as a distal end of the rotary lever is moved toward the brake disc; and
   wherein the actuating plunger is pivotably mounted on the rotary lever and directly on one of the pressure plate and the application-side brake pad, the mount on the rotary lever being located on an axis of rotation of the rotary lever about which the rotary lever rotates when the brake application device is actuated.

2. The disc brake as claimed in claim 1, further comprising a wear adjusting device for adjusting for wear of the brake pads and/or brake disc.

3. The disc brake as claimed in claim 1, wherein the actuating plunger is pivotably fastened such that tensile and compressive forces are transmittable to an electric motor and to the application-side brake pad.

4. The disc brake as claimed in claim 2, wherein the actuating plunger is pivotably fastened such that tensile and compressive forces are transmittable to an electric motor and to the application-side brake pad.

5. The disc brake as claimed in claim 1, wherein the actuating plunger is mounted on and fastened to an eccentric rotational axle of the rotary lever and to the pressure plate or to the application-side brake pad such that said actuating plunger compensates for pivoting movements of the brake rotary lever and tangential sliding movements of the brake pad and/or the pressure plate by pivoting in two mutually perpendicular pivoting directions.

6. The disc brake as claimed in claim 2, wherein the actuating plunger is mounted on and fastened to an eccentric rotational axle of the rotary lever and to the pressure plate or to the application-side brake pad such that said actuating plunger compensates for pivoting movements of the brake rotary lever and tangential sliding movements of the brake pad and/or the pressure plate by pivoting in two mutually perpendicular pivoting directions.

7. The disc brake as claimed in claim 3, wherein the actuating plunger is mounted on and fastened to an eccentric rotational axle of the rotary lever and to the pressure plate or to the application-side brake pad such that said actuating plunger compensates for pivoting movements of the brake rotary lever and tangential sliding movements of the brake pad and/or the pressure plate by pivoting in two mutually perpendicular pivoting directions.

8. The disc brake as claimed in claim 1, wherein the actuating plunger is provided, at its two mounting ends, with pivot bearings, the transmission of force taking place both on the rotary lever side and on the pressure-plate side by joint journals, with the joint journal of the rotary lever being arranged such that its rotational axis intersects that of the pressure plate.

9. The disc brake as claimed in claim 8, wherein the pivot bearings are spherical bearings.

10. The disc brake as claimed in claim 1, wherein the actuating plunger has a multi-part design.

11. The disc brake as claimed in claim 3, wherein a threaded drive is arranged between the electric motor and the rotary lever.

12. The disc brake as claimed in claim 1, wherein the actuating plunger is designed as an actuating plunger module, which is axially variable in length, for compensating brake pad and/or brake disc wear.

13. The disc brake as claimed in claim 12, wherein the actuating plunger module comprises the actuating plunger, a threaded spindle and a joint bearing housing.

14. The disc brake as claimed in claim 12, wherein to transmit the adjusting rotational movement, the actuating plunger module is coupled by a synchronization gearing to a wear adjusting device.

15. The disc brake as claimed in claim 13, wherein to transmit the adjusting rotational movement, the actuating plunger module is coupled by a synchronization gearing to a wear adjusting device.

16. The disc brake as claimed in claim 12, wherein the actuating plunger module is connected to a gearwheel such that, when the disc brake is not actuated, there is a narrow degree of tooth play with respect to further coupled gearwheels, and that, when the disc brake is actuated, the gearwheels are placed so far out of engagement by an application movement of the actuating plunger that the pivoting movement of the actuating plunger which takes place then is enabled.

17. The disc brake as claimed in claim 1, wherein a rotary bearing on the rotary lever eccentric axle comprises spherical roller bearings.

18. The disc brake as claimed in claim 1, wherein at least one rotary bearing or both rotary bearings of the rotary lever, are designed as spherical rotary axles or as a bearing bush, which is flared slightly diametrically toward the two end regions.

19. A self-boosting disc brake having a brake disc, comprising:
a caliper which, in use, straddles the brake disc;
a brake application device arranged in the caliper for applying brake pads against the brake disc; and
wherein the brake application device comprises a rotary lever being located within the caliper that acts on an actuating plunger, the actuating plunger acting directly or via a pressure plate on an application-side one of the brake pads as a distal end of the rotary lever is moved toward the brake disc; and
wherein the actuating plunger is pivotally mounted on the rotary lever and directly on the pressure plate or the application-side brake pad, the mount on the rotary lever being located on an axis of rotation of the rotary lever about which the rotary lever rotates when the brake application device is actuated.

* * * * *